UNITED STATES PATENT OFFICE.

HENRY LEMPFERT, OF GREEN POINT, NEW YORK.

IMPROVEMENT IN PROCESSES FOR PREPARING PAINT FROM COKE.

Specification forming part of Letters Patent No. 220,394, dated October 7, 1879; application filed February 12, 1879.

*To all whom it may concern:*

Be it known that I, HENRY LEMPFERT, of Green Point, in the county of Kings and State of New York, have invented a new and useful Process for Preparing Paint from Coke, which improvement is fully set forth in the following specification.

This invention consists in preparing paint from coke by first reducing the coke to a fine powder in the presence of water, then placing the mass into a kiln and heating the same to a red heat, and finally grinding the reheated coke together with linseed-oil.

In carrying out my invention I take coke of any kind and reduce the same in the presence of water by the action of a suitable mill into a fine powder. From the mill the wet mass is introduced into a kiln and heated to a red heat, so as to drive out the moisture and to burn all impurities still mixed with the coke, particularly sulphur. After the coke has thus been reheated I grind the same together with linseed-oil ready to be used as a paint.

My paint can be mixed with any suitable vehicle, and it is of particular advantage for painting ship-bottoms; but it may be used for various kinds of work.

I do not claim the manufacture of a paint pigment by grinding coke, coal, charcoal, &c., in a dry state, which is then mixed with water or spirit and ground in a thick pasty state, the wet mass of coke, &c., being reheated, and finally mixed with oil or varnish, the water or spirit being driven off, as such is not my invention; but

What I claim as new, and desire to secure by Letters Patent, is—

The within-described process of preparing paint, the same consisting in reducing coke to a powder in the presence of water, then reheating the wet mass to expel the moisture and destroy all impurities still remaining in the coke, and finally grinding the coke with linseed-oil, substantially in the manner set forth.

In testimony that I claim the foregoing I have hereunto set my hand and seal this 6th day of February, 1879.

HENRY LEMPFERT. [L. S.]

Witnesses:
W. HAUFF,
E. F. KASTENHUBER.